May 13, 1947.   F. W. H. MUELLER   2,420,611

ANTI-STATIC PHOTOGRAPHIC FILM

Filed Dec. 14, 1945

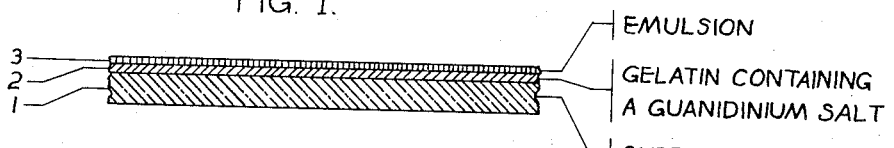

FIG. 1.
- 3 — EMULSION
- 2 — GELATIN CONTAINING A GUANIDINIUM SALT
- 1 — SUPPORT

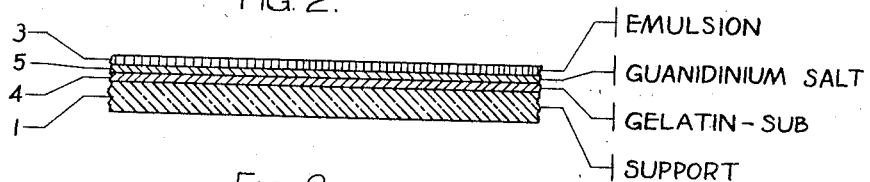

FIG. 2.
- 3 — EMULSION
- 5 — GUANIDINIUM SALT
- 4 — GELATIN-SUB
- 1 — SUPPORT

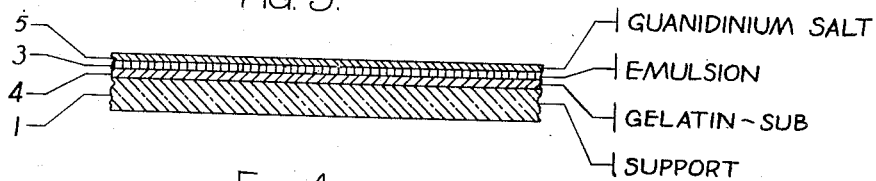

FIG. 3.
- 5 — GUANIDINIUM SALT
- 3 — EMULSION
- 4 — GELATIN-SUB
- 1 — SUPPORT

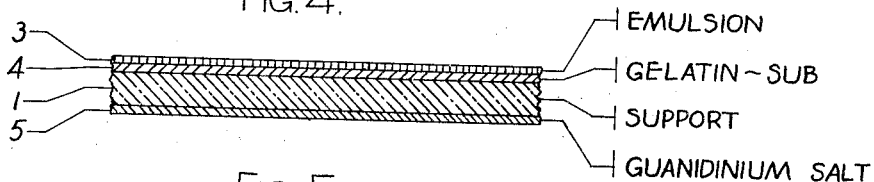

FIG. 4.
- 3 — EMULSION
- 4 — GELATIN-SUB
- 1 — SUPPORT
- 5 — GUANIDINIUM SALT

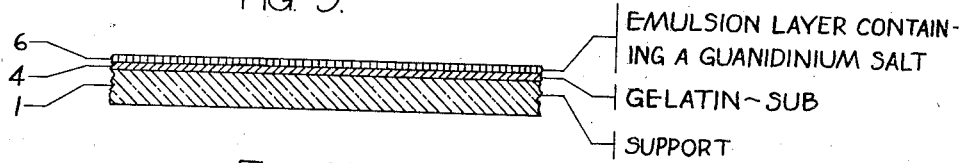

FIG. 5.
- 6 — EMULSION LAYER CONTAINING A GUANIDINIUM SALT
- 4 — GELATIN-SUB
- 1 — SUPPORT

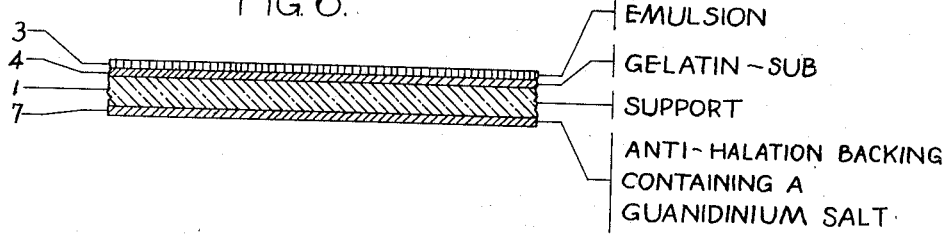

FIG. 6.
- 3 — EMULSION
- 4 — GELATIN-SUB
- 1 — SUPPORT
- 7 — ANTI-HALATION BACKING CONTAINING A GUANIDINIUM SALT

*INVENTOR.*
FRITZ W. H. MUELLER
BY
ATTORNEYS

Patented May 13, 1947

2,420,611

UNITED STATES PATENT OFFICE 2,420,611

ANTISTATIC PHOTOGRAPHIC FILM

Fritz W. H. Mueller, Binghamton, N. Y., assignor to General Aniline & Film Corporation, New York, N. Y., a corporation of Delaware Application December 14, 1945, Serial No. 635,048

12 Claims. (Cl. 95—9)

This invention relates to photographic film and more particularly to film having anti-static coatings.

Considerable difficulty has been encountered in the manufacture and use of photographic film due to the accumulation of electrical charges on the film. These electrical charges, which are known as static, develop when photographic film is handled during processing as, for example, when film sheets are separated from each other or when motion picture film is passed through a projector. The more serious difficulty is the accumulation of static in the application of the various coatings in the manufacturing process of the photographic film and in the passage of manufactured film through the camera. Manifestations of these charges are glow discharges which after development of the exposed film show up as black streaks or lines, or as irregular fogged patterns in the emulsion layer. Attempts have been made to overcome static in films by the application of substances which are electrolytes or possess hygroscopic properties. The function of these substances is to impart conductivity to the film and thus dissipate the electrical charges before their accumulation leads to local discharges. Many of these substances are incompatible with the materials which form one or more layers of the photographic film and introduce new manufacturing difficulties.

An object of the present invention is to provide means for eliminating static charges on a photographic film.

A further object is to provide means for reducing static charges in a photographic film base during coating of the sensitive silver-halide emulsion.

A still further object is to provide means for reducing static charges in a photographic film during passage through a camera or printer.

Further objects will appear hereinafter.

These objects are accomplished by the present invention by incorporating, in layers of the film or on the surface of the film, a salt of a guanidinium compound of the following general formulae:

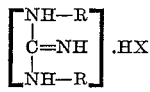

and

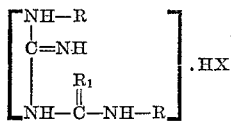

wherein R is hydrogen, alkyl, e. g., methyl, ethyl, propyl, isopropyl, butyl, isobutyl, amyl, isoamyl, and the like, alicyclic, e. g., cyclopentyl, cyclohexyl, cycloheptyl, and the like, aryl, e. g., phenyl, naphthyl, diphenyl, etc., aralkyl, e. g., benzyl, methyl benzyl, ethyl benzyl, and the like, $R_1$ is either oxygen or an imino (NH) group, and X is an anion of a monobasic aliphatic carboxylic acid of at least 8 carbon atoms typified by the formula:

in which $R_2$ is an aliphatic radicle, e. g., heptyl, octyl, nonyl, decyl, undecyl, dodecyl, tridecyl, tetradecyl, pentadecyl, hexadecyl, heptadecyl, octadecyl, heptenyl, octenyl, nonenyl, decenyl, undecenyl, dodecenyl, tridecenyl, tetradecenyl, pentadecenyl, hexadecenyl, heptadecenyl, octadecenyl, 2-methyl-cyclohexyl, cycloheptyl, 1.2.2.3-tetramethyl cyclopentyl, 2.2.3-trimethyl-$\Delta^3$-cyclopentenyl, 1.2.3-trimethyl-$\Delta^2$-cyclopentenyl, methyl cyclopentenyl (the alicyclic group found in petroleum naphthenic acids), and the like.

The monobasic aliphatic carboxylic acid salts of a guanidine compound represented by the above general formulae, which for sake of convenience and brevity will be referred to hereinafter as guanidinium salts, are prepared by reacting a guanidine compound such as guanidine, methyl-guanidine, ethyl-guanidine, propyl-guanidine, dimethyl-guanidine, diethyl-guanidine, cyclopentyl - guanidine, cyclohexyl - guanidine, phenyl - guanidine, diphenyl - guanidine, di-o-tolyl-guanidine, benzyl-guanidine, methylbenzyl-guanidine, ethylbenzyl-guanidine, carbamylguanidine, N-methyl-carbamylguanidine, N-ethyl-N'-methyl - carbamylguanidine, N-cyclohexyl-carbamylguanidine, N - cyclopentyl - N'-ethyl-carbamylguanidine, N-phenyl-carbamylguanidine, N - phenyl - N'- propyl - carbamylguanidine, N-methyl-N'-phenyl-carbamylguanidine, N-benzyl-carbamylguanidine, N-ethyl-N'-methylbenzyl-carbamylguanidine, guanylguanidine, N-methyl-guanylguanidine, N-ethyl-N'-ethyl-guanylguanidine, N-propyl-N'-phenyl-guanylguanidine, N-cyclohexyl - guanylguanidine, N-cyclohexyl-N'-methyl - guanylguanidine, N - phenyl - N'-cyclohexyl - guanylguanidine, N - phenyl - N'-benzyl-guanylguanidine, N-benzyl-guanylguanidine, N-benzyl-N'-methyl-guanylguanidine, and the like with an aliphatic monobasic carboxylic acid of at least 8 carbon atoms, e. g., caprylic, lauric, myristic, stearic, oleic, linolic, linoleic, ricinoleic, sulforicinoleic, hexahydro-o-toluic acid, cycloheptanecarboxylic acid, d-campholic acid, α-campholytic acid, lauronolic acid, naphthenic acid and the like. The reaction is conducted by dissolving one mol of the guanidine compound and one mol of the monobasic aliphatic carboxylic acid in alcohol and allowing the mixture to stand at room temperature for a short time, say for about 15 minutes. The mixture is then filtered, the precipitate washed with alcohol and dried.

The sulfo-oleate salts may be prepared by mixing molecular equivalents of the guanidine compound with the sodium salt of sulfo-oleic acid (prepared according to United States Patent 1,926,424) on the steam bath at 60° C.; after 10-15 minutes the temperature of the reaction mixture is allowed to rise to about 90° C. It is then cooled to room temperature and dissolved in a small quantity of methanol. The resulting solution is then treated with ether to precipitate sodium chloride which is filtered off. Finally the solvents are evaporated.

Specific guanidinium salts, which have been prepared by the above procedure, are the following:

Guanidinium-stearate
N-methyl-guanidinium-oleate
N-cyclohexyl-guanidinium-naphthenate
Diphenyl-guanidinium-stearate
Di-o-tolyl-guanidinium-oleate
N-benzyl-guanidinium-palmitate
Carbamylguanidinium-stearate
N-methyl-carbamylguanidinium-oleate
N - cyclopentyl - carbamylguanidinium - naphthenate
N - phenyl - N' - methyl - carbamylguanidinium-sulfooleate
N-benzyl-carbamylguanidinium-sulforicinoleate
Guanylguanidinium-stearate
N-methyl-guanylguanidinium-oleate
N-cyclohexyl-guanylguanidinium-naphthenate
N-phenyl-N'-guanylguanidinium-palmitate
N-benzyl-guanylguanidinium-sulfooleate These guanidinium salts may be applied to the film in various ways to eliminate static. As for example, they may be applied as a constituent of a sub-layer or as a coating over a sub-layer; to the finished film either on the obverse surface, reverse surface or to the light-sensitive emulsion; or to either surface of the exposed and processed film. The various modes of applying these esters will now be described with reference to the accompanying drawing.

In the accompanying drawing Figs. 1 to 6, inclusive, represent sectional views of a film provided with anti-static layers in accordance with the present invention.

As shown in Fig. 1 a film base of transparent material such as cellulose organic ester, for example, cellulose acetate, cellulose formate, cellulose propionate, cellulose butyrate, cellulose acetate-propionate, cellulose acetate-butyrate, and the like, or cellulose nitrate, or film-forming polymers, such as polyvinyl chloride, co-polymers of vinyl chloride-vinyl acetate, co-polymers of vinyl chloride-vinylidene chloride, polyamides, superpolymers, and the like, is coated with a thin gelatin sub-layer 2 to which has been added one of the guanidinium salts referred to above. The light-sensitive emulsion layer 3 is coated directly over this gelatin sub-layer.

In the modification shown in Fig. 2, the base 1 is coated with the usual gelatin sub-layer 4 and directly over this layer is coated a solution of one of said guanidinium salts 5. The light-sensitive emulsion layer 3 is coated directly over the layer 5.

In Fig. 3 the support 1 is coated with the usual gelatin sub-layer 4 and the light-sensitive emulsion layer 3. The antistatic layer 5 consisting of a solution of such guanidinium salt is coated over the light-sensitive emulsion layer 3.

The anti-static layer 5 may be applied to a film base 1 opposite to that bearing the usual gelatin sub-layer 4 and light-sensitive emulsion layer 3 as shown in Fig. 4.

In Fig. 5 the support 1 is coated with the usual gelatin sub-layer 4. Over this sub-layer is coated a light-sensitive emulsion layer 6 containing such guanidinium salt.

In Fig. 6 the base 1 is coated with the usual gelatin sub-layer 4 and light-sensitive emulsion layer 3. The anti-halation layer 7 containing one of said guanidinium salts is coated on the opposite side of the film base 1.

The guanidinium salts may be applied to the film either in a solvent or in a non-solvent for the film base. Where the guanidinium salt is applied in admixture with a light-sensitive emulsion, or beneath the sensitive layer or over the sensitive layer it is applied either in an aqueous solution or some other suitable solvent which does not adversely affect the light-sensitive emulsion, such as for example, methyl or ethyl alcohol and the like. In employing the guanidinium salts as a back-wash they may be applied to the film base in a solvent such as methanol, acetone or a mixture thereof, or in a 1.5% solution of gelatin, or an alkali soluble resin prepared according to United States Patent 2,089,764.

The following specific examples illustrate several of the various methods of applying these guanidinium salts as anti-static coatings, and it will be understood that these examples merely represent the preferred embodiments and are not to be considered as limitative.

*Example I*

13.15 cc. of a 5% solution of diphenyl-guanidinium stearate in methanol corresponding to 6.5 grams of the salt are dispersed in 500 cc. of 1.5% gelatin and applied as a top layer upon a light-sensitive silver-halide emulsion.

*Example II*

0.2 gram of di-o-tolyl-guanidinium oleate is dissolved in 100 cc. of a mixture consisting of 30% methanol and 70% acetone. To this solution 0.2 gram of a resin prepared from phenoxyacetic acid and formaldehyde according to Example 2 of United States Patent 2,089,764 is dissolved. This solution is applied directly on cellulose acetate base.

*Example III*

0.2 gram of guanidinium stearate is dissolved in 100 cc. of a mixture consisting of 30% methanol and 70% acetone. The solution is applied as a back-wash directly on cellulose acetate base.

*Example IV*

100 cc. of a 10% solution of carbamylguanidinium oleate in methanol are added to 10 kg. silver-halide emulsion and coated upon a cellulose acetate base.

The above specific examples are to be regarded as merely illustrative of the invention, and not in any sense restrictive. It will be obvious to anyone skilled in the art that many modifications such as substituting equivalent material and varying the proportions of materials used are within the spirit and scope of the invention as defined in the appended claims.

I claim:

1. A photographic element comprising a support carrying a photographic emulsion layer and an anti-static layer comprising a guanidinium salt corresponding to the following general formulae:

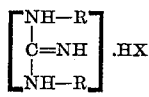

and

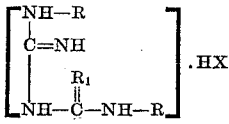

where R is a member selected from the class consisting of hydrogen, alkyl, alicyclic, aryl, and aralkyl groups, $R_1$ is a member selected from the class consisting of oxygen and imino group, and X is the anion of a monobasic aliphatic carboxylic acid of at least 8 carbon atoms.

2. A photographic element comprising a support carrying a photographic emulsion layer and an anti-static layer comprising guanidinium stearate.

3. A photographic element comprising a support carrying a photographic emulsion layer and an anti-static layer comprising diphenyl guanidinium stearate.

4. A photographic element comprising a support carrying a photographic emulsion layer and an anti-static layer comprising di-o-tolyl guanidinium oleate.

5. A photographic element comprising a support carrying a photographic emulsion layer and between said support and said emulsion layer, an anti-static layer comprising a guanidinium salt corresponding to the following general formulae:

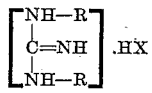

and

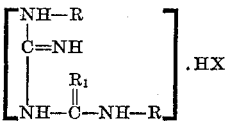

where R is a member selected from the class consisting of hydrogen, alkyl, alicyclic, aryl, and aralkyl groups, $R_1$ is a member selected from the class consisting of oxygen and imino group, and X is the anion of a monobasic aliphatic carboxylic acid of at least 8 carbon atoms.

6. A photographic element comprising a support carrying a photographic emulsion layer and, on the opposite side of said support, an anti-static layer comprising a guanidinium salt corresponding to the following general formulae:

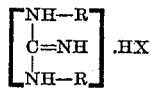

and

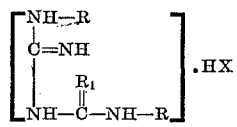

where R is a member selected from the class consisting of hydrogen, alkyl, alicyclic, aryl, and aralkyl groups, $R_1$ is a member selected from the class consisting of oxygen and imino group, and X is the anion of a monobasic aliphatic carboxylic acid of at least 8 carbon atoms.

7. A photographic element according to claim 5 in which the anti-static layer comprises guanidinium stearate.

8. A photographic element according to claim 5 in which the anti-static layer comprises diphenyl guanidinium stearate.

9. A photographic element according to claim 5 in which the anti-static layer comprises di-o-tolyl guanidinium oleate.

10. A photographic element according to claim 6 in which the anti-static layer comprises guanidinium stearate.

11. A photographic element according to claim 6 in which the anti-static layer comprises diphenyl guanidinium stearate.

12. A photographic element according to claim 6 in which the anti-static layer comprises di-o-tolyl-guanidinium oleate.

FRITZ W. H. MUELLER.